United States Patent

Gevelt et al.

[11] Patent Number: 6,028,380
[45] Date of Patent: Feb. 22, 2000

[54] ARRANGEMENT IN A BULB GENERATOR

[75] Inventors: Bjørn Gevelt, Hokksund; Kåre Olaf Oftedal, Sandefjord, both of Norway

[73] Assignee: ABB Kraft AS, Drammen, Norway

[21] Appl. No.: 09/029,450

[22] PCT Filed: Aug. 29, 1996

[86] PCT No.: PCT/NO96/00213

§ 371 Date: Jun. 8, 1998

§ 102(e) Date: Jun. 8, 1998

[87] PCT Pub. No.: WO97/09771

PCT Pub. Date: Mar. 13, 1997

[30] Foreign Application Priority Data

Sep. 5, 1995 [NO] Norway ..................................... 953495
Feb. 8, 1996 [NO] Norway ..................................... 960507

[51] Int. Cl.⁷ ..................................................... H02K 9/18
[52] U.S. Cl. ................................. 310/52; 310/54; 310/64; 310/59; 415/177; 290/52; 60/912
[58] Field of Search ................................... 415/177, 178; 290/54, 52; 310/52, 54, 58, 59, 60 R, 64; 60/912; 405/78

[56] References Cited

U.S. PATENT DOCUMENTS

| | | | |
|---|---|---|---|
| 2,801,821 | 8/1957 | Burger | 310/54 |
| 3,081,824 | 3/1963 | Macall | 165/179 |
| 3,229,130 | 1/1966 | Drouard | 310/54 |
| 3,936,681 | 2/1976 | Liebe | 310/54 |
| 4,308,464 | 12/1981 | Yamamoto | 290/52 |
| 4,445,046 | 4/1984 | Allegre et al. | 310/62 |
| 4,524,285 | 6/1985 | Rauch | 290/43 |
| 5,101,128 | 3/1992 | Veronesi et al. | 310/54 |
| 5,333,680 | 8/1994 | Sinhuber | 165/47 |
| 5,568,781 | 10/1996 | Vaillancourt et al. | 114/20.2 |

FOREIGN PATENT DOCUMENTS

| | | | |
|---|---|---|---|
| 0560993 | 9/1993 | European Pat. Off. | H02K 9/19 |
| 0581841 | 2/1994 | European Pat. Off. | H02K 9/18 |
| 81871 | 6/1953 | Norway . | |
| 155305 | 3/1987 | Norway | F03B 13/01 |
| WO9220134 | 11/1992 | WIPO | H02K 9/18 |

Primary Examiner—Nestor Ramirez
Assistant Examiner—B. Mullins
Attorney, Agent, or Firm—Volpe and Koenig, P.C.

[57] ABSTRACT

The present invention relates to an arrangement in a bulb generator (G), comprising a generator housing (1, 10, 110, 210, 310, 410) arranged in a water flow for letting turbine water flow there along and towards the turbine (4), which arrangement comprises means for removing surplus heat generated during operation of the generator, which mean comprise elements which are assembled as flow channels for coolant and/or heated generator air for indirect or direct cooling of the generator air, and for the purpose of providing a cooling system which to a large degree is independent of the quality of the river water or turbine water, and which also comprises elements which are non-costly as regards manufacturing and assembly, it is according to the present invention suggested that said means (111; 411) comprise, as known per se, extruded elements, especially elements which either comprise channels or by assembly define channels (112; 412) for circulating coolant, especially circulating air, or any other appropriate coolant, and that an outer surface of the extruded elements is exposed to bypassing turbine water.

20 Claims, 10 Drawing Sheets

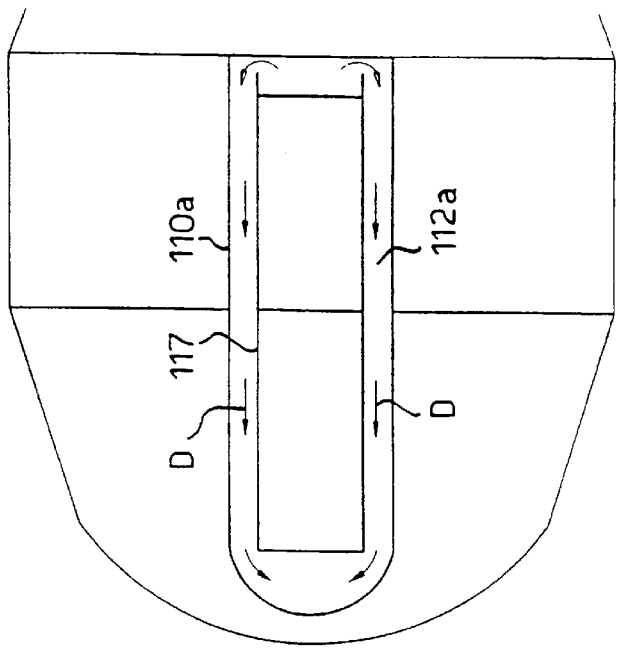
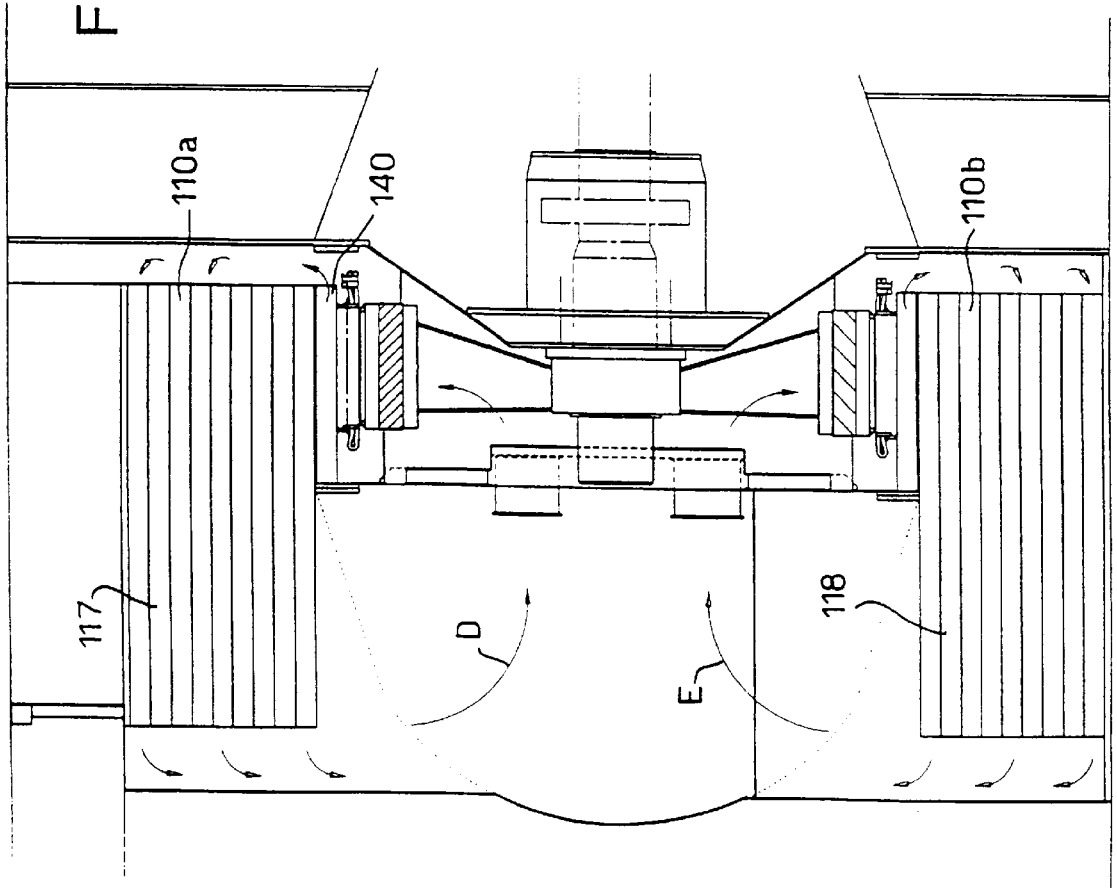

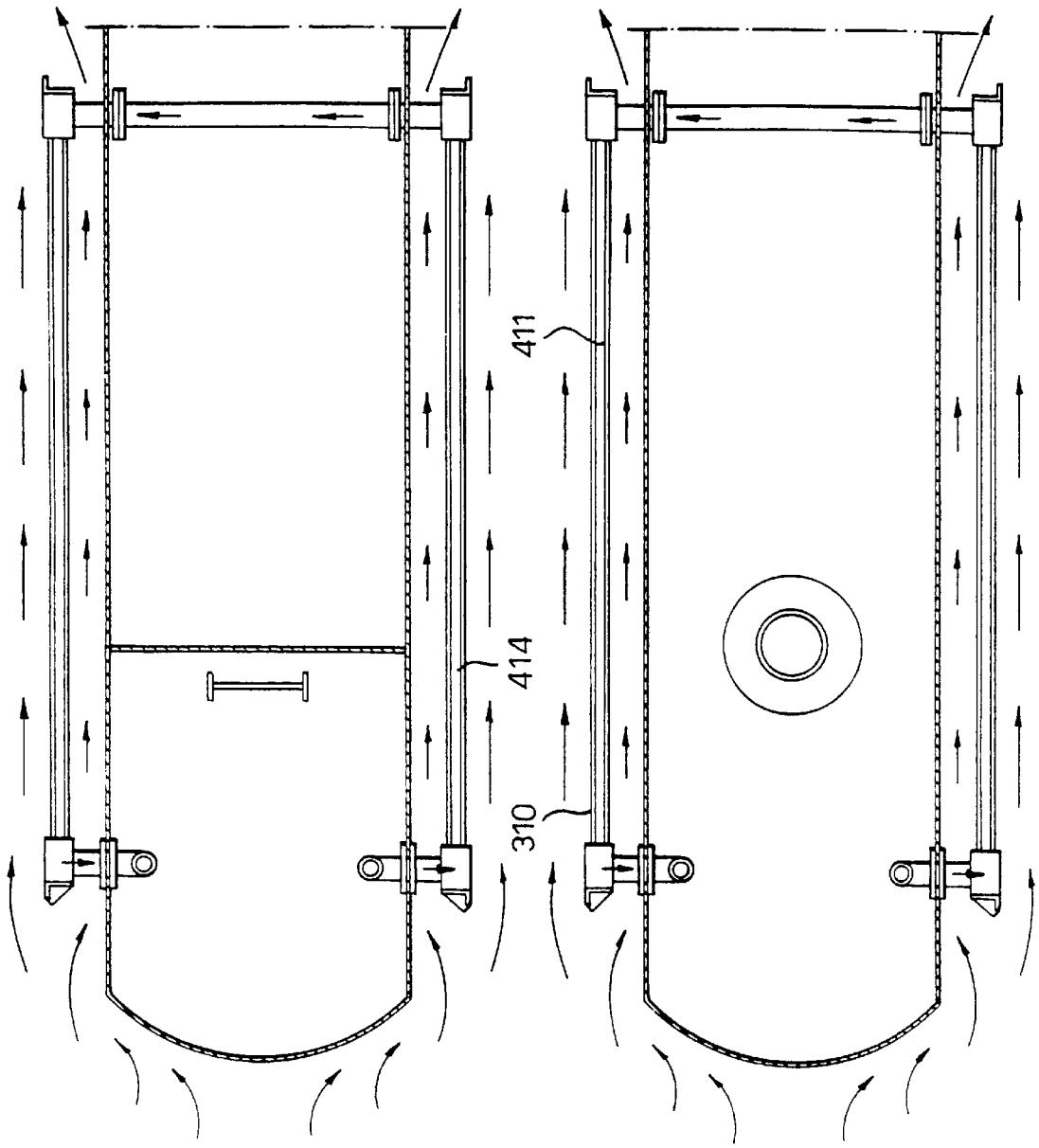

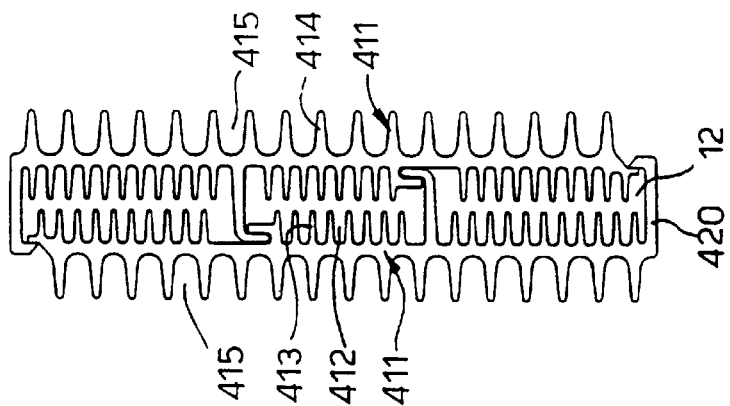
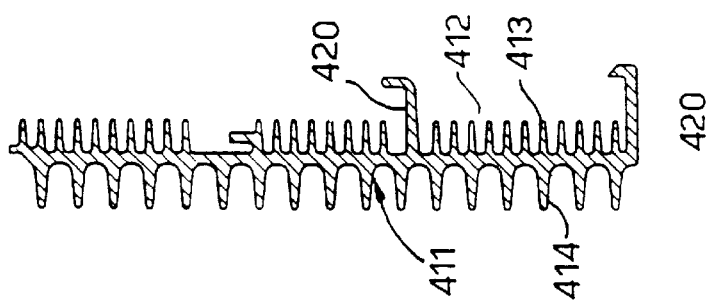
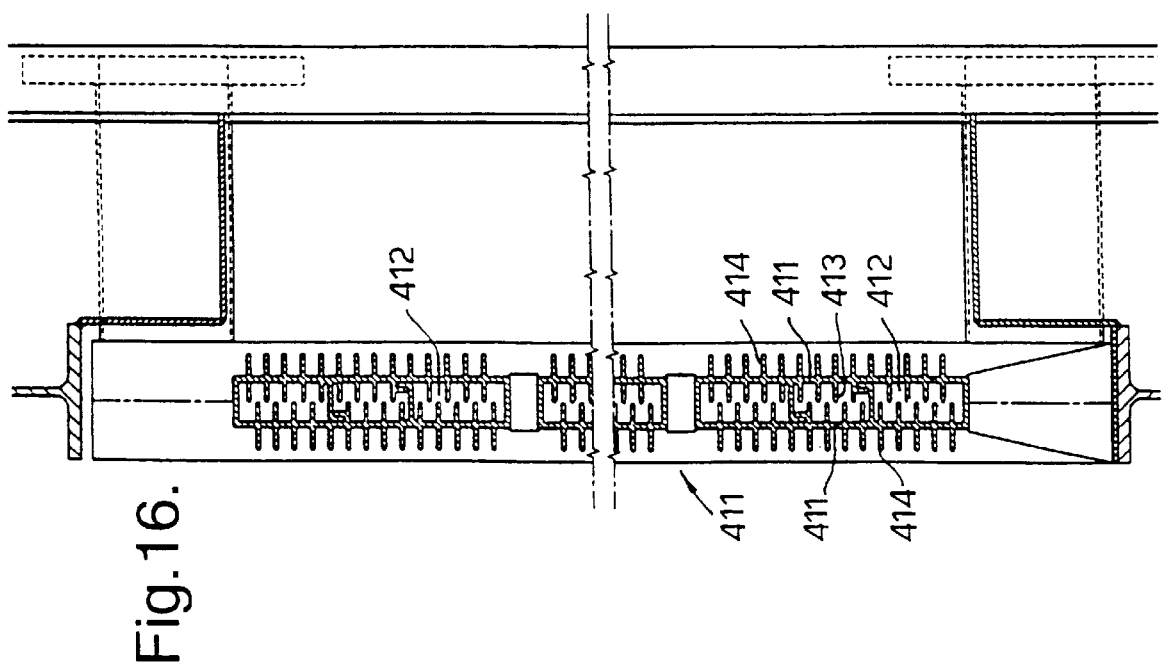

ARRANGEMENT IN A BULB GENERATOR

FIELD OF THE INVENTION

The present invention relates to an improved arrangement in a bulb generator, comprising a generator housing arranged in a water flow which flows therealong and towards the turbine, which arrangement comprises means for removing surplus heat generated during operation of the generator, which means comprise elements which are assembled as flow channels for coolant and/or heated generator air for indirect or direct cooling of the generator air

PRIOR ART

A known technique for cooling bulb generators comprises water/air-heat exchangers located in the generator housing or bulb, the water being supplied from outside via pipes down the access shaft of the generator. Such an arrangement is often hampered with problems, inter alia because filters are required due to the quality of the river water.

It has also been suggested to use the bulb wall as a heat exchanger in order to avoid said problems. In such an arrangement the bulb wall is made double in the conical part of the nose portion, such that there is provided a water/water exchanger ("double skin cooler"). The water in the intermediate spacing is circulated by means of pumps through the conventional water/air exchanger. Even if such a prior art system may operate well, it is hampered with certain weaknesses especially as regards costly extra expenditures including comprehensive welding work, expensive materials, etc., the heat resistance through the bulb wall being relatively large. The requirement for necessary cooling surface will therefor influence the dimensions of the nose portion of the bulb or generator housing.

NO 155.305 (SA Alsthom-Atlantique) refers to an immersed apparatus encapsuled in a housing, wherein the outer cooling takes place by means of cooling pipes through which are circulated cooling air, which cooling pipes are provided on the outside of the generator housing in order to allow cooling of the coolant gas by means of the water flowing through the water channel.

U.S. Pat. No. 4,524,285 (Rauch) refers to a hydro dynamic device, comprising a first pipe-shaped housing, a second housing having a conical front portion provided inside the first housing, and holding an electrical generator, as well as a third housing being designed with a conical portion opposite of that of the second housing. Through said first housing water is flowing along the outer surface of the second housing, which water is driving a turbine and contributes to the removal of heat generated by the generator.

U.S. Pat. No. 5,333,680 (Sinhuber/Elin Energieversorgung GmbH) refers to a cooling system for a generator being installed in a chamber which is surrounded by flowing water, the walls of the chamber being manufactured from plate metal, and said walls of the chamber in the direction of the water flow being designed as a cooling radiator provided substantially as a double wall ("double jacket cooler") including channel-like cooling pockets wherein the secondary coolant can flow and by appropriate control be used for cooling the generator air.

EP 0.581-841 (Reitinger/Elin Energieversorgung GmbH) relates to a bulb generator having separate cooled, static converting elements residing in the nose portion of the turbine housing, and being cooled indirectly by the water flowing therearound.

U.S. Pat. No. 3,936,681 refers to a cooling aggregate for an electrical generator, wherein is maintained an arched forward portion of the turbine housing, said arched outer wall being provided with a plurality of short hook-like cooling fins. The purpose of the short, hook-shaped cooling fins is to facilitate the adaption to the arched (non-contoured) portions of the bulb.

Consequently, according to these publications it is not a token about preferably "longitudinal" and "straight" and double contoured extruded elements which are to be included as cooling elements in a bulb generator, i.e. especially by letting the outer surfaces comprise outer grooves having a favourable flow characteristics.

NO 81.871 relates to elements in a heat exchanger of the plate type, wherein are suggested plates provided with corrugations, especially in order to render stiffness to the plates, said plates comprising both "large" corrugations and "small" corrugation running in parallel with the larger ones, all of which being provided for defining an inner hollow space having specific velocity and flow related changes for the liquid to flow between two such plates. According to this patent publication it is a token about preferably corrugated thin plates, manufactured by pressing, which hardly can be appropriate in the design of bulb turbines or generators.

Thus, non of the mentioned publications give any instructions about the use of extruded elements, especially elements of aluminium which have been assembled for, in connection with a bulb generator, giving combined outer and inner flow characteristics and heat exchanging properties.

OBJECTS OF THE INVENTION

An object of the present invention is to provide an arrangement of the type as stated in the preamble, which both as regards cost and operation exhibits large advantages in relation to prior art.

Further, an object of the present invention is to provide an arrangement wherein welding work and expensive materials are reduced to a minimum, whilst at the same time providing an arrangement having favourable cooling characteristics, and at the same time avoiding the disadvantages related to possible polluted river water.

SUMMARY OF THE INVENTION

The above objects are achieved in an arrangement in a bulb generator of the type as stated in the preamble, which according to the present invention is characterized in that said means comprise, as known per se, extruded elements, especially elements which either comprise channels or by assembly define channels for circulating coolant, especially coolant air, or any other appropriate coolant, and that an outer surface of the extruded elements is exposed to bypassing turbine water.

An appropriate embodiment can be to the fact that said extruded elements are contoured preferably on both sides, such that said channels comprise inner protrusions in the form of cooling fins or ribs rendering a large heat conductions surface, and such that said elements on the outside define in the flow direction extending outer ribs or grooves for flow favourable surface contact with turbine water flowing therealong or thereabout.

Such cooling elements having both outer and inner contours, may constitute a part of or substantially the overall front portion of the generator housing, said elements operating both as a flow guiding structure and heat exchanger.

Alternatively, said elements may in assembled position constitute an individual flow capsule or a supporting device for said bulb generator, especially as a base or foundation, in any case appropriately located in relation to the generator water and in appropriate communication with the bulb generator.

Further features and advantages of the present invention will appear from the following description taken in connection with the appended drawings, as well as from the appending patent claims.

BRIEF DISCLOSURE OF THE DRAWINGS

FIG. 4 is on a larger scale a section through the generator housing illustrated in FIG. 3.

FIG. 5 is a section as seen from above, through the upper part of the generator housing illustrated in FIG. 3 and FIG. 4.

FIG. 14 and FIG. 15 are sections on a larger scale taken along the line A—A and the line B—B of FIG. 13, respectively.

FIG. 16 illustrates on a somewhat larger scale a section through the main parts included in the embodiment illustrated in FIGS. 13, 14 and 15.

FIG. 17 is a section through an embodiment of an extruded profile which appropriately may be included in the arrangement according to FIGS. 14–16.

FIG. 18 illustrates an end view wherein a plurality of the profiles according to FIG. 17 are assembled to inner circulation channels including cooling fins protruding thereinto, said circulation channels defining outer ribs and grooves.

DETAILED DESCRIPTION OF EMBODIMENTS

Figure 1:
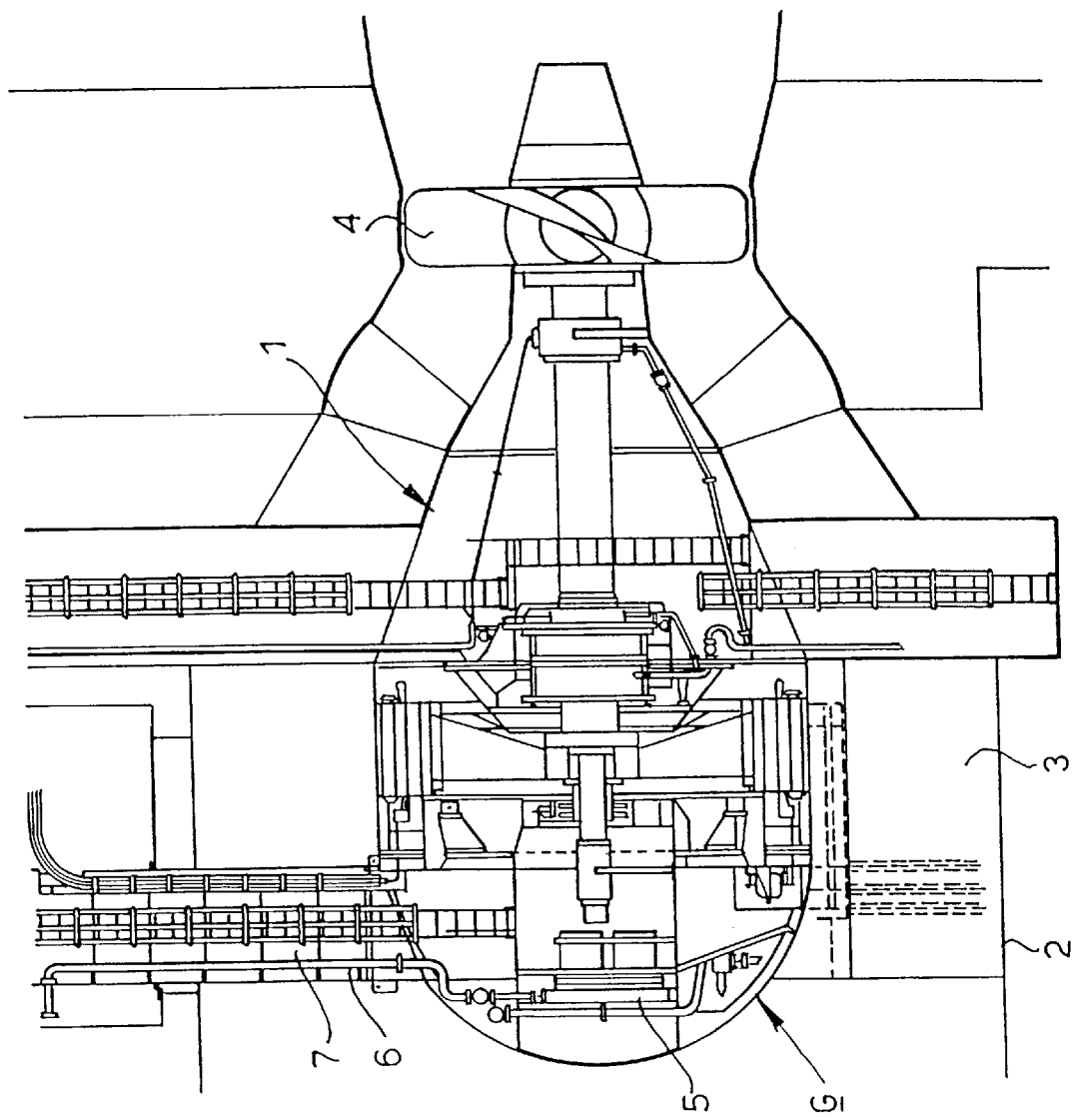
FIG. 1 is a schematical cross section through bulb type turbo generator, comprising previously known cooling technique.

In FIG. 1 which illustrates a schematical section through a bulb type hydro generator G, the bulb or the generator housing itself is designated by reference numeral 1, said generator housing 1 constituting the main member of a hydro generator which is located in a turbine pipe 2 wherethrough river water 3 or similar flows therealong and towards the turbine 4 provided downstreams in relation to said generator housing 1.

The hydro generator G illustrated in FIG. 1, comprises a conventional technique for cooling said hydro generator, said generator comprising water/air heat exchanges 5 located down in the bulb, the water being supplied from outside via pipes 6 through the access shaft 7 of the generator. The cooling water itself is taken from the river water, which often requires filters due to the quality of the river water, which in turn makes the installation of a river generator more expensive and complicated.

Figure 2:
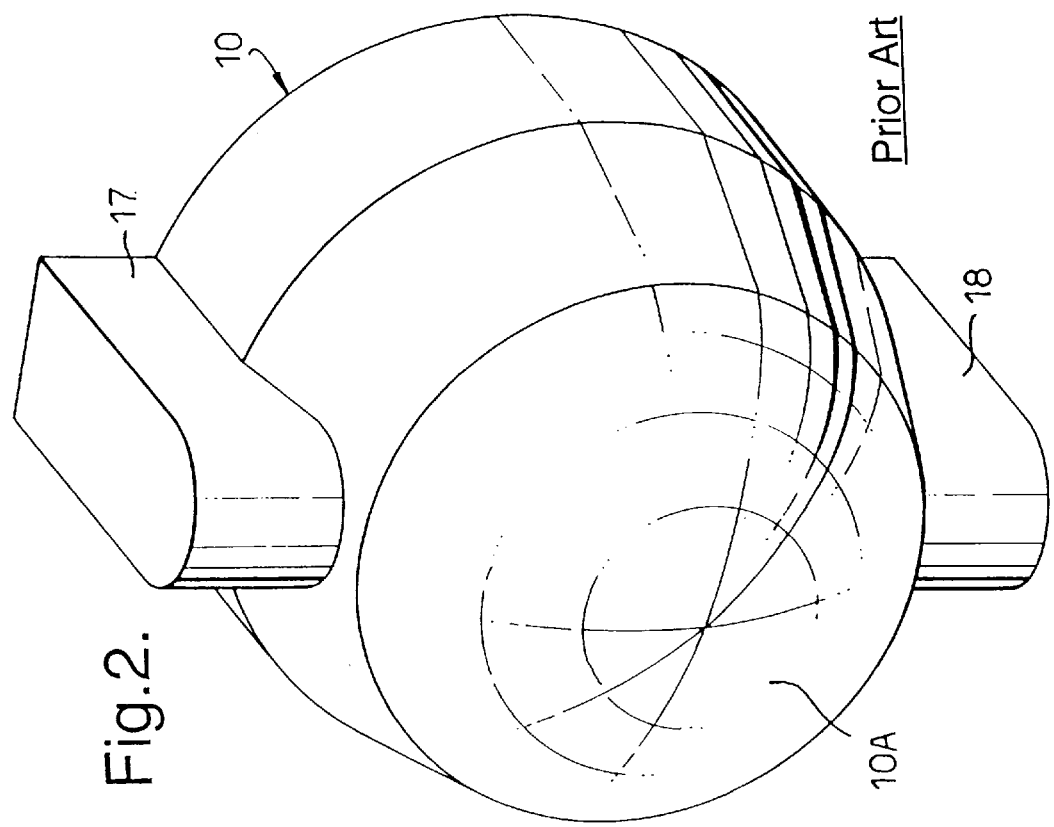
FIG. 2 is a perspective view of the front nose portion of a generator housing having a substantially smooth, double curved surface, according to known technique.

In FIG. 2 there is perspectively illustrated a view of the front nose portion 10A of a generator housing 10 having a substantially smooth, double curved surface, which portion is designed double for thereby providing a water/water heat exchanger ("double skin cooler"). Here the water in the intermediate space may be circulated by means of pumps through the conventional water/air heat exchangers, for example of the type as discussed in connection with FIG. 1. Such double curved surfaces have hitherto been made of steel, and the surfaces are provided by welding more or less double curved spherical elements, which involves substantial welding work.

At the top the generator housing 10 is provided with an access shaft 17, and at the bottom with a foundation 18.

Figure 3:
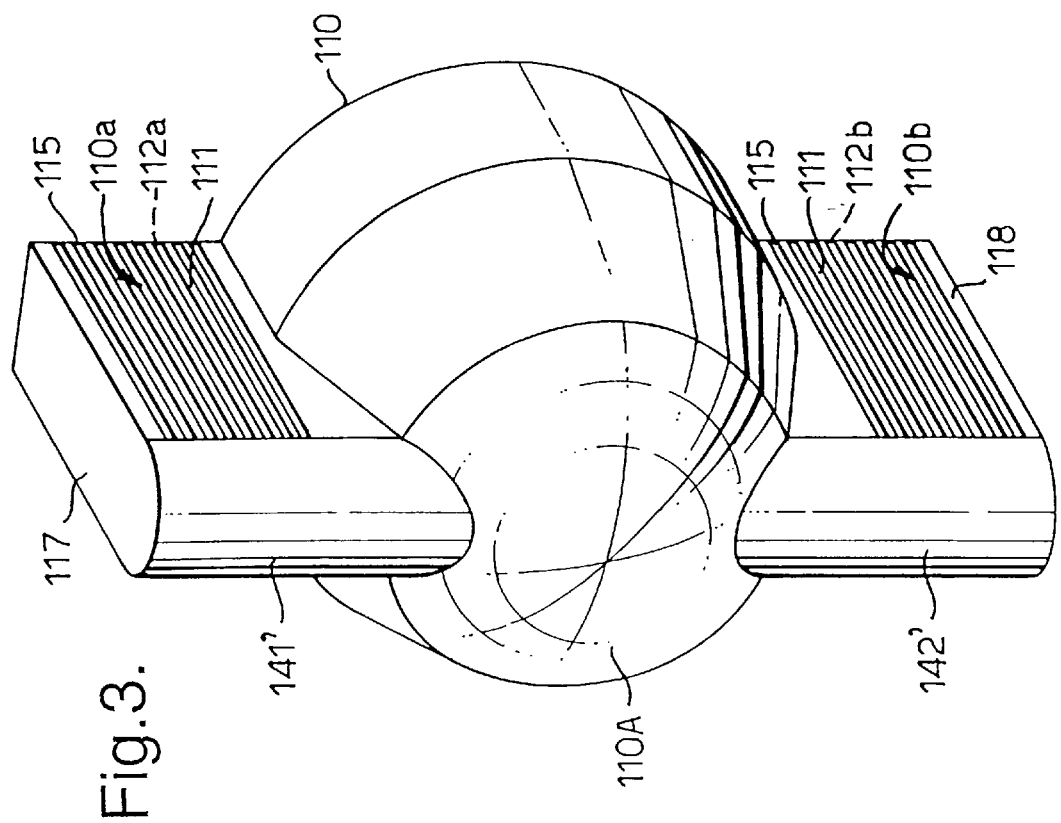
FIG. 3 is a perspective view similar to FIG. 2, but wherein one or more parts of the generator housing represent an example of an embodiment of an arrangement according to the invention.

In FIGS. 3, 4, and 5 there are illustrated details of an example of an embodiment of an arrangement according to the invention, wherein the coolant, especially coolant air, is passed through means giving direct heat exchange with turbine water flowing therearound.

In FIG. 3 it is perspectively illustrated a generator housing 110 having a nose portion 110A which still have substantially the same design as the nose portion 10A as illustrated in FIG. 2, but wherein around an upper access shaft 117 and a pedestal or foundation 118 there have been constructed means functioning both as an outer flow guiding structure and an inner heat exchanger.

Figure 11:
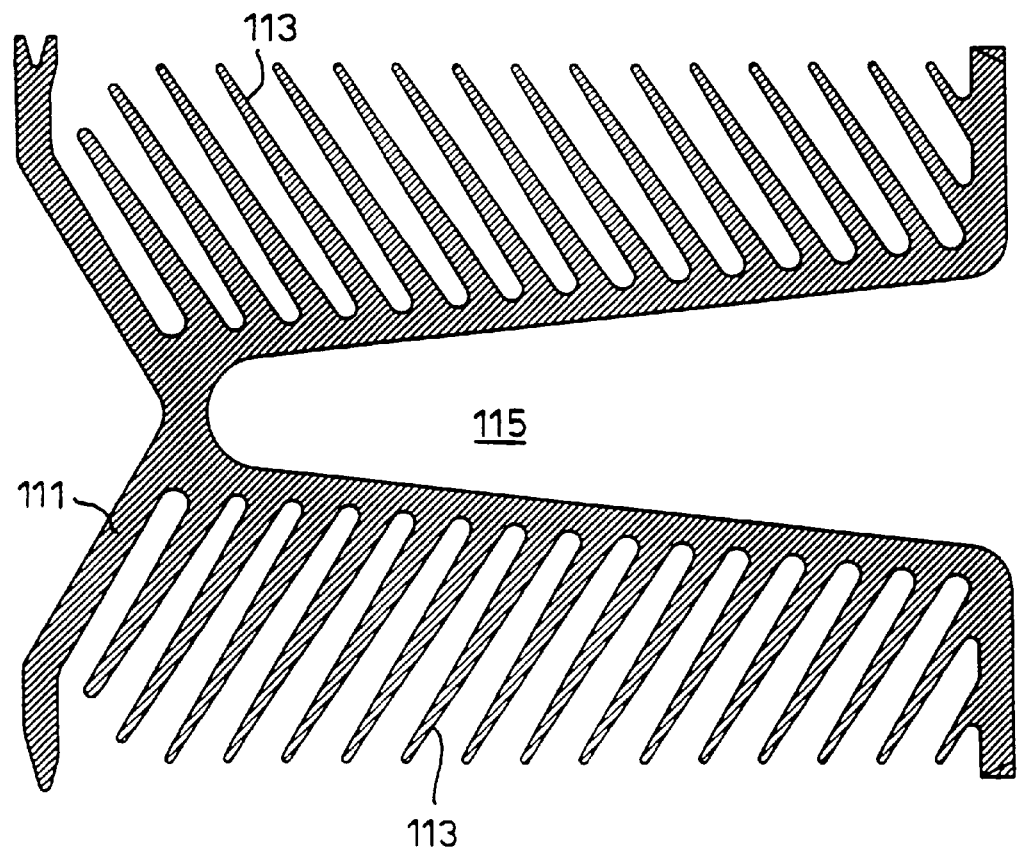
FIG. 11 is a section on a larger scale through an embodiment of an extruded profile which appropriately may be included in an arrangement according to the invention.
Figure 12:
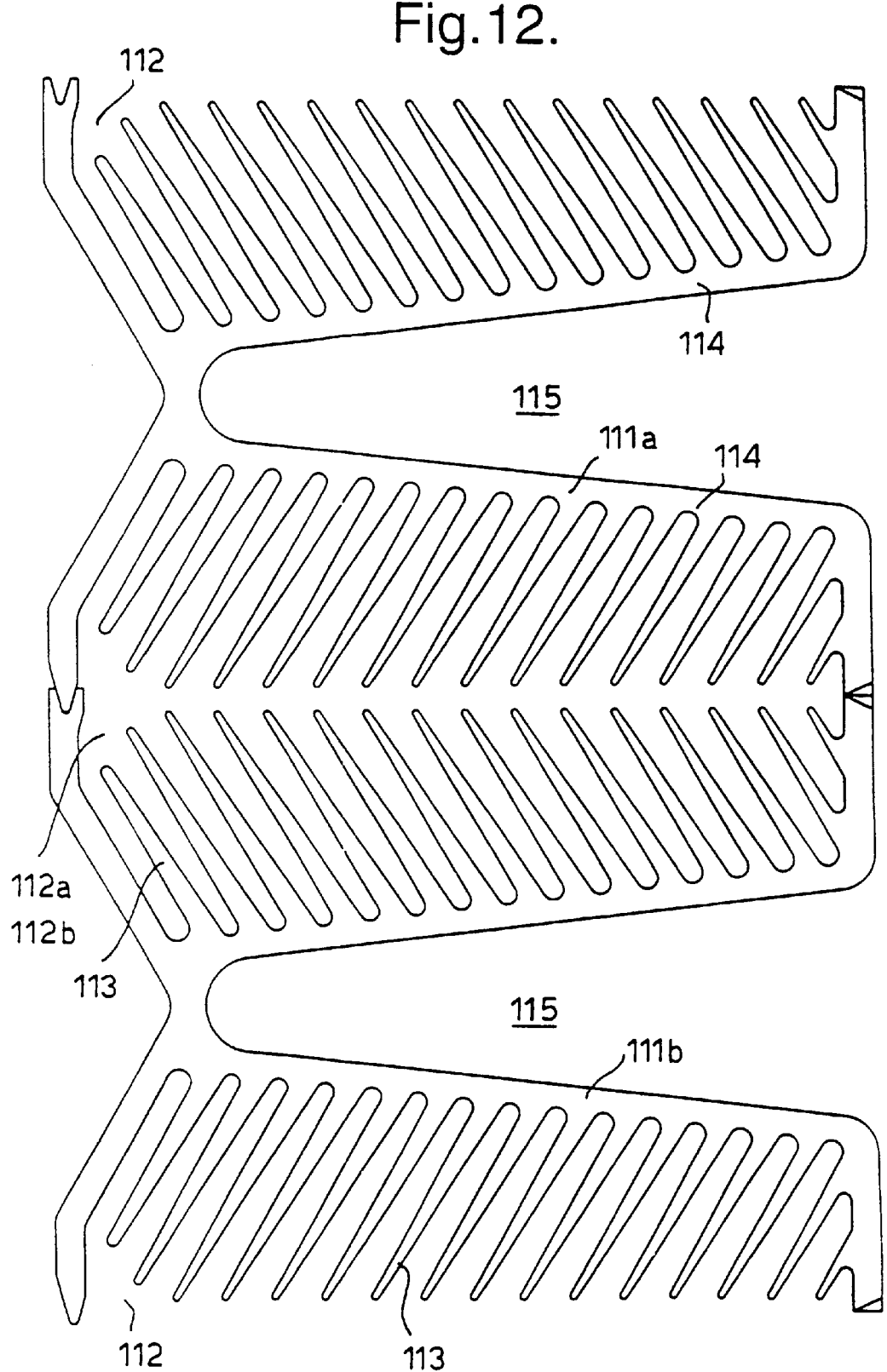
FIG. 12 illustrates an end view wherein a plurality of the profiles according to FIG. 11 are assembled to inner circulation channels including cooling fins protruding there into, said circulation channels defining outer ribs and grooves.

In other words, around the upper access shaft 117 there have been included cooling means 110a and 110b, respectively, which individually comprises elements, especially elements 111 which either can comprise channels or by assembly define channels 112a and 112b, respectively, for circulating coolant, especially coolant air, or any other appropriate coolant, for example elements of the type illustrated in FIGS. 11 and 12. In the latter Figures it is also illustrated how such channels 112a, 112b comprise inner protrusions in the form of cooling fins or ribs 113 rendering a large heat conductance surface.

Further, from FIG. 3 it appears that said cooling means 110a and 110b are designed so as to outwardly defining outer ribs and grooves 115 extending in the flow direction for flow favourable surface contact with turbine water flowing therealong or thereabout, as this is also illustrated in detail in FIGS. 11 and 12.

Further, it appears from FIGS. 4 and 5 that the elements which are included in the cooling means 110a and 110b around the access shaft 117 and the foundation 118, respectively, can allow cooling air to be undisturbedly excited at the one peripheral side of the generator 140, and thereafter be turned into the channels 112a of the cooling means comprising said elements 110a and 111b, respectively, wherefrom the cooled circulated air, see the arrows D and E, can be returned to the central portion of the generator.

Since the profile elements included in the respective cooling means 110a and 110b preferably are constituted by straight parallel plate portions extending in the flow direction, which upstreams merge into the curved plate portions 141' and 142', respectively, there is achieved a flow picture which to a large degree can be compared with the flow picture which is illustrated in FIG. 2, wherein conventional design methods are used.

It is to be understood that the material from which the cooling means 110a, 110b are made, should have favourable characteristics as regards thermal conductivity as well as favourable durability against corrosion, at the same time as the material can be manufactured in a simple manner by extrusion, for example aluminium, plastic or appropriate alloys or mixtures of other materials.

In FIGS. 6–9 there are illustrated details in connection with a further example of an embodiment of an arrangement according to the invention, wherein the coolant, especially circulating air and/or bearing oil can be passed through means which render direct heat exchange with turbine water flowing therearound.

In the embodiment according to FIGS. 6–9 said means rendering direct heat exchange with turbine water flowing therearound, may constitute substantially the overall front portion of the generator housing, said means functioning both as a flow guiding structure and a heat exchanger.

It is to be understood that said means can be build either as a self supporting structure or said means can be assembled with outer supporting means, for example foundations and/or access shafts.

Figure 6:
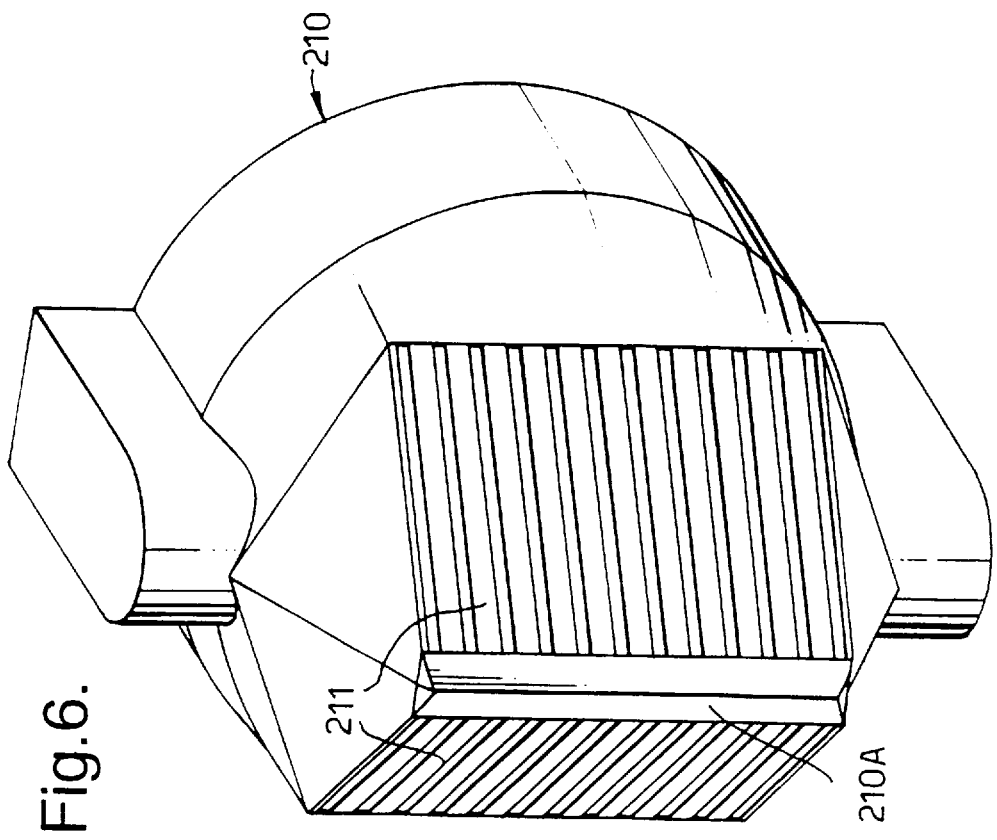
FIG. 6 is a perspective view similar to FIG. 2, but wherein a specific nose portion is included in another example of an embodiment of an arrangement according to the invention.
Figure 8:
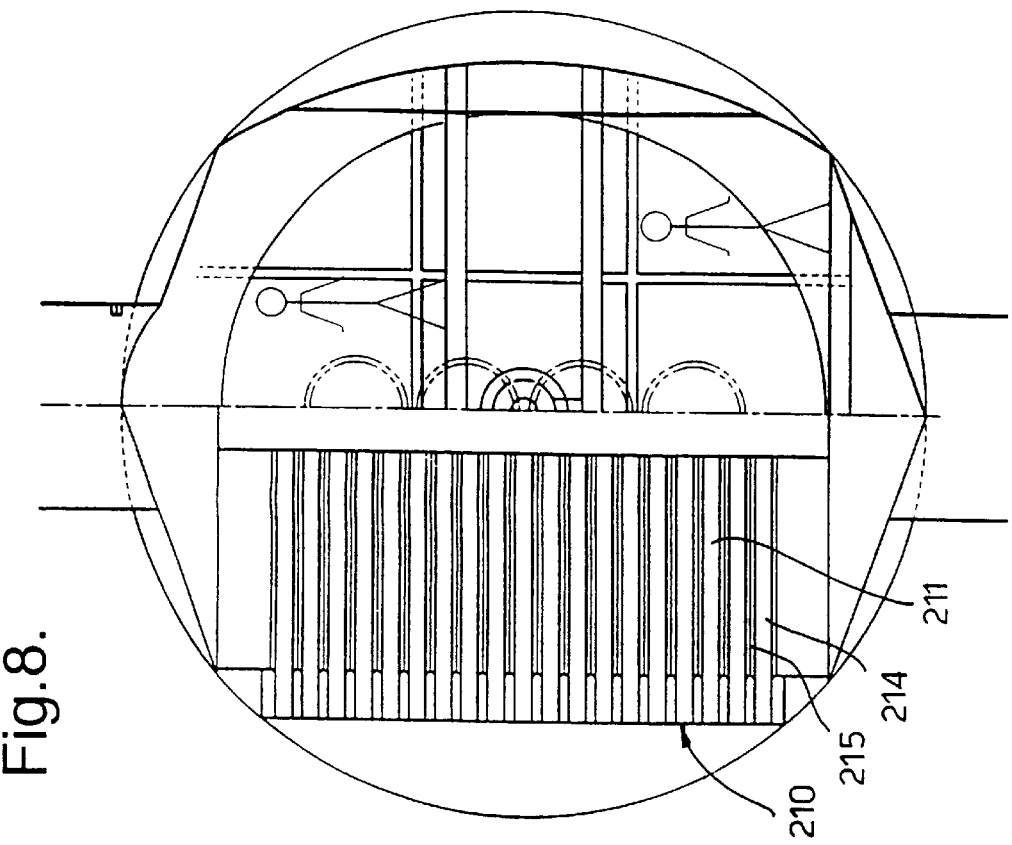
FIG. 8 is partly a front view and partly a section taken along the lines A—A in FIG. 7.
Figure 7:
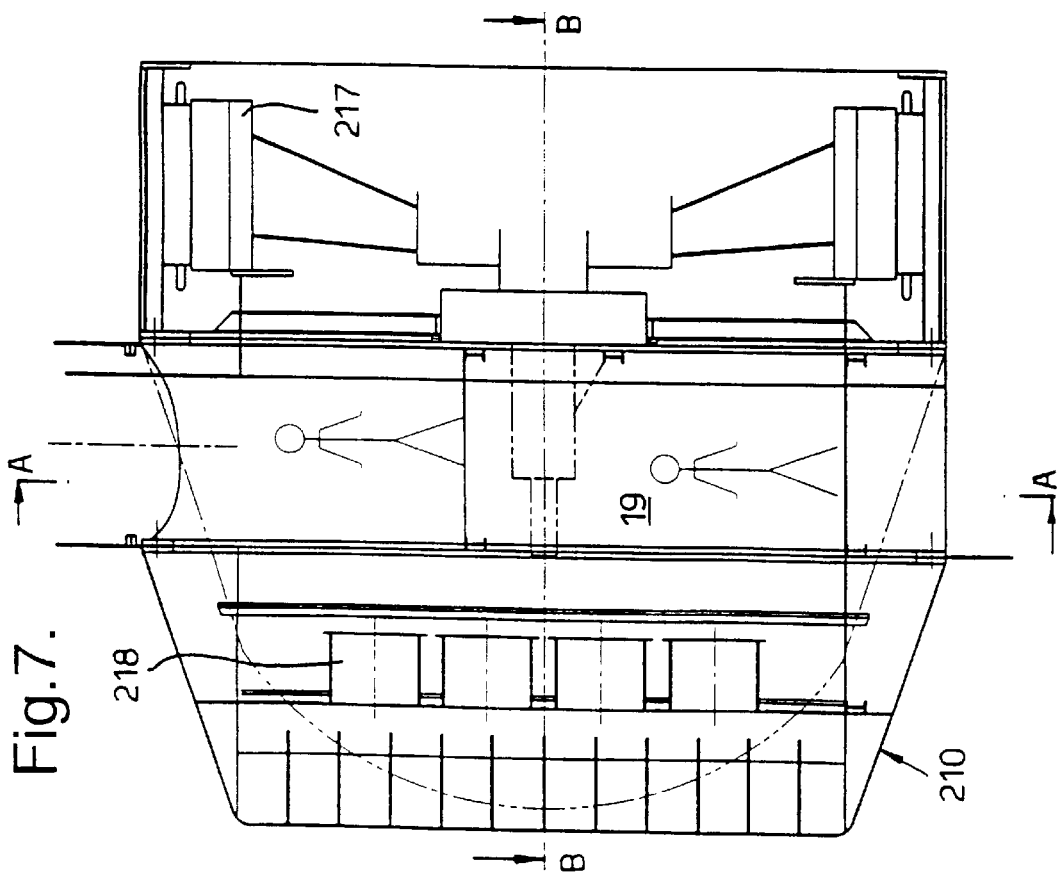
FIG. 7 is a section through the nose portion illustrated in FIG. 6.

In FIG. 6 there is perspectively illustrated a hydro generator housing 210 having a nose portion 210A which is included in an example of an embodiment of an arrangement according to the invention, said nose portion being designed from extruded elements, especially extruded aluminium profiles, for example also here of the embodiment as illustrated in FIGS. 11 and 12, but here designated 211.

Figure 9:
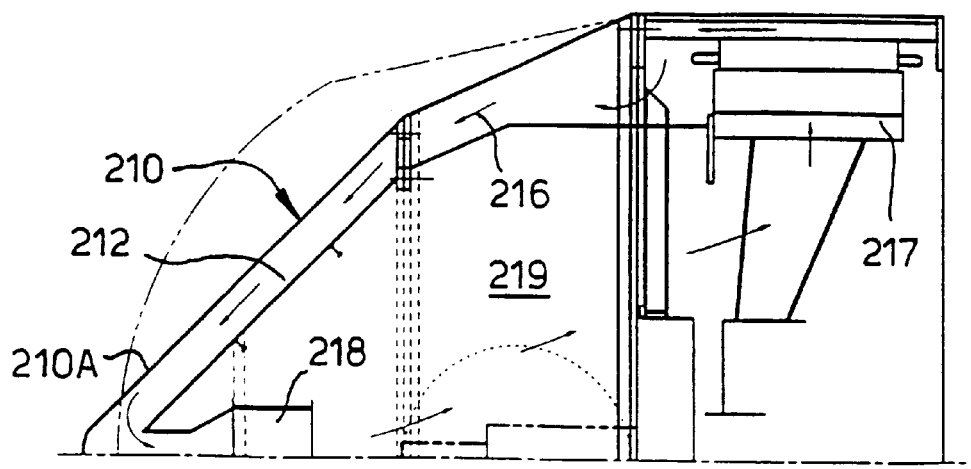
FIG. 9 is a section taken along the line B—B in FIG. 7.

In FIGS. 6–9 which illustrate details of a nose portion 210A constituting another embodiment of an arrangement according to the invention, it is especially in FIG. 9 seen how the circulating air in the form of arrows 216 is guided through the inner channels 212 from various generator parts 217, and via fans 218 back to the machine room 219.

It is to be understood that the circulated air 216 can be used for direct cooling of generator parts 217, and that the circulated air also can operate as a heat exchanger as regard cooling of bearing oil.

As specifically illustrated in FIG. 6 and FIG. 9 the nose portion 210A of the generator may be designed with a wedge-shaped structure, similar to a straight ship bow, but it is to be understood that the wedge-shaped structure also can be bent or buckled in the form of two or more straight surfaces on each side, for thereby achieving an appropriate flow guidance of the river water.

Figure 10:
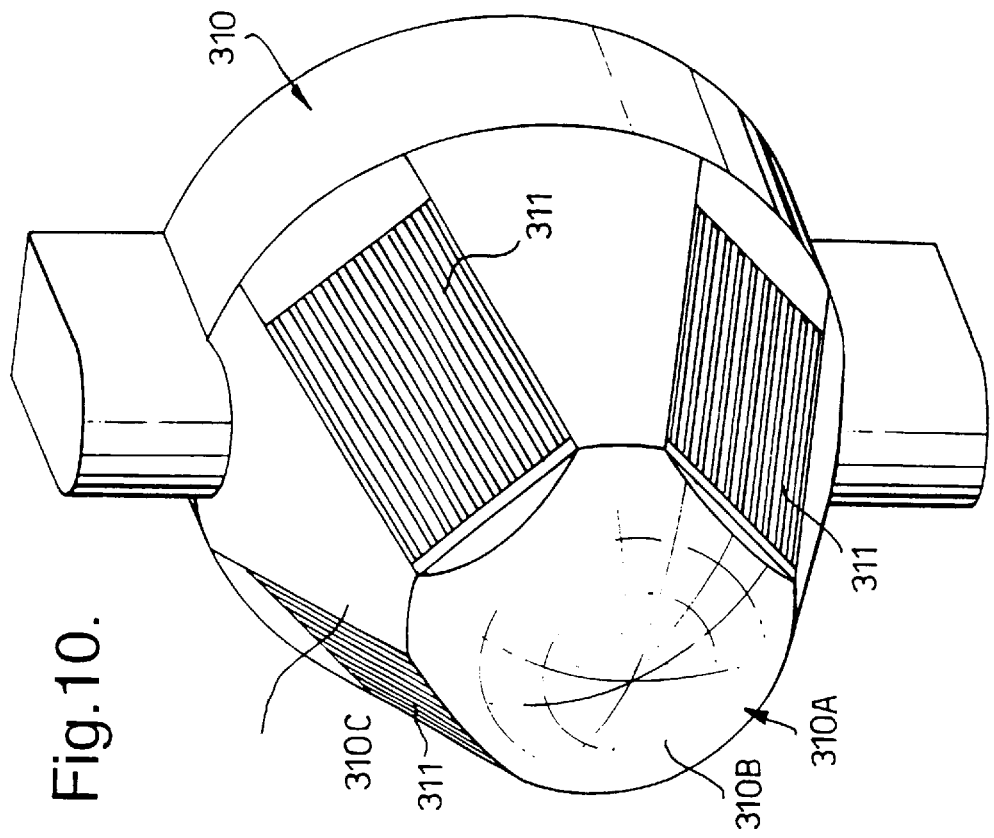
FIG. 10 is a perspective view similar to FIG. 2, but wherein the nose portion is designed as still another example of an embodiment of an arrangement according to the present invention.

In FIG. 10 there is illustrated yet another examples of an embodiment, wherein is illustrated a hydro generator 310 having a nose portion 310A comprising extruded elements 311, spaced around said nose portion 310A. Also here the elements 311 are designed as straight elements in the flow direction, which elements appropriately merging with a curved forward nose portion 310B and further curved portions 310C between said elements 311. Also here the elements may be designed as discussed in connection with FIGS. 11 and 12.

As previously described it is in connection with FIGS. 11 and 12 illustrated an example of an individual profile 111 and a double profile 111a, 111b, said two elements 111a, 111b being of the type illustrated in FIG. 12, and being assembled to define inner circulating channels 112, or 112a, 112b, for circulating air, at the same time as cooling fins 113 protrude into the channels, and at the same time as said circulating channels 112 define outer ribs 114 with grooves or recesses 115 provided therebetween. The inner cooling fins 113 will, as previously discussed, render a large heat conductance surface, and the alternating outer ribs 114 and tracks 115 will render large contact surface with the river water flowing there-around.

It is to be understood that the arrangement according to the invention may comprise cooling means, appropriately designed as substantially extruded elements, which in assembled position define an individual flow capsule or define a supporting devise for the bulb generator, especially as a base or foundation, in both cases located in the water flow outside the bulb, and at the same time in appropriate communication with the bulb generator with its coolant, especially purified cooling water or any other appropriate coolant.

Figure 13:
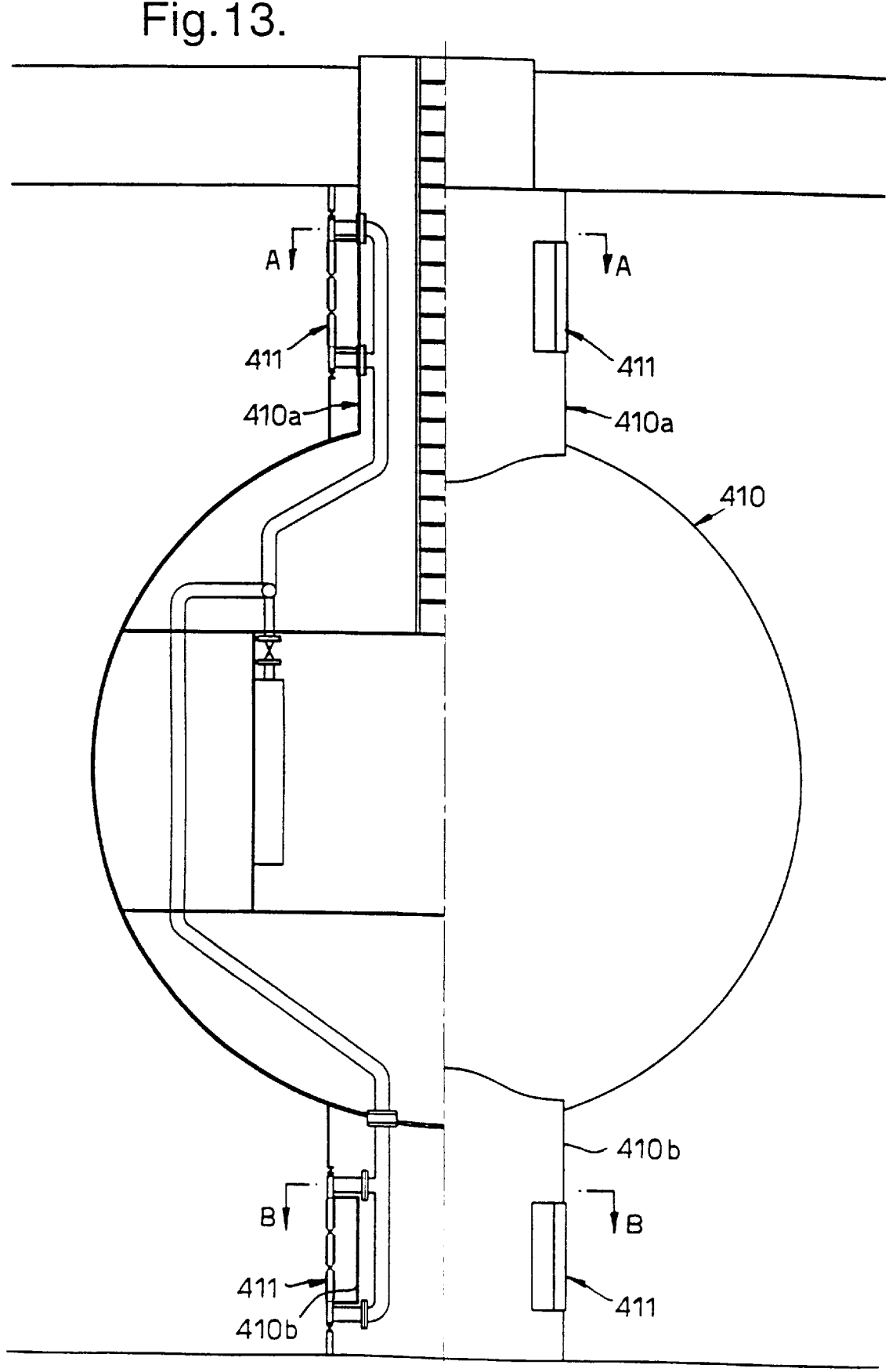
FIG. 13 is a front view, partly in section, of a variant of an embodiment of an arrangement according to the invention, especially wherein the arrangement constitutes or is a part of one or more supporting devices for a generator housing.

In FIGS. 13–15 there is illustrated an embodiment of an arrangement according to the invention wherein the arrangement constitutes or is included as a part of an upper supporting device 410a and a lower support device 410b for a generator housing 410, comprising extruded elements 411.

FIG. 16 illustrates on a larger scale a section through the main elements included in the embodiment illustrated in FIGS. 13, 14 and 15.

FIG. 17 is section through an embodiment of an extruded profile which appropriately may be included in the arrangement according to FIGS. 13–15.

FIG. 18 illustrates an end view wherein a plurality of the profiles according to FIG. 17 have been assembled to inner circulating channels having cooling fins protruding thereinto, said circulating channels defining outer ribs and grooves.

Also here the cooling means 410a, 410b have been designed from extruded elements, said elements 411 on the one side comprising cooling fins 413 and on the other side comprising cooling ribs 414. By assembling a plurality of such elements 411 such elements will assembled in pairs define inner channels 412 having a series of inner cooling ribs 413 for coolant, especially purified water, at the same time as the assembled channels 412 on the outside define rib-shaped cooling surfaces 414 in the form of grooves 415 provided with fins exposed to the bypassing turbine water.

In addition to the protruding "inner" cooling fins 413 there are at certain distances provided combined spacing and supporting fins 420 which by an axial turning of the elements 180° in relation to each other provide pairs of self-supporting channel-shaped elements, which will render the subsequent welding work more easy.

What is claimed is:

1. A cooling system arrangement for a bulb generator (G), comprising a generator housing (1, 10, 110, 210, 310, 410) with associated access shaft (117) and foundation (118) arranged in a water flow for letting turbine water flow therealong and towards a turbine (4), the cooling system arrangement for removing surplus heat generated during operation of the generator comprising elements which are assembled to define at least one outer contoured surface on a portion of the generator having outer grooves (115;415) defined by outer ribs (114; 414) exposed to bypassing turbine water, said assembled elements also defining inner channels for the circulation of fluid to effect cooling of the generator.

2. Arrangement as claimed in claim 1, characterized in that circulating air is driven through said inner channels.

3. Arrangement as claimed in claim 1, characterized in that said elements are assembled as a self-supporting structure.

4. Arrangement as claimed in claim 1, characterized in that said elements are extruded elements which as assembled define a supporting structure for said bulb generator, housing.

5. Arrangement as claimed in claim 1, characterize in that said elements constitute a front portion (110A) of the generator housing (110), said elements operating both as flow conducting structure and heat exchanger.

6. Arrangement as claimed in claim 1, characterized in that said contour surface of the generator which is defined by said elements is on the upper access shaft (117) and/or the lower foundation (118).

7. Arrangement as claimed in claim 6, characterizes in that said elements are so adapted that circulating air for cooling the generator in the generator housing can be passed without obstruction out from one peripheral side (140) of the generator and thereafter be guided into said inner channels defined by said elements, wherein the air is cooled and wherefrom the cooled circulating air is directed to a central portion of the generator.

8. Arrangement as claimed in claim 6, characterized in that a plurality of contour surfaces are defined by said elements and are located symmetrically in relation to the access shaft and/or foundation for optimizing flow.

9. Arrangement as claimed in claim 1, wherein said elements comprise extruded elements (111; 412) provided with protrusions (113; 413) on both sides of said plates, whereby said extruded elements (111; 412) by assembly in pairs define said inner channels (112; 412) with internal cooling ribs (113; 413) and define said outer ribs (114; 414) for contact with bypassing turbine water.

10. Arrangement as claimed in claim 9, characterized in that said contour surface of the generator which is defined by said elements is on the upper access shaft (117) and/or the lower foundation (118).

11. Arrangement as claimed in claim 9, characterized in that said elements constitute a portion (110A) of the generator housing (110), said elements operating both as flow conducting structure and heat exchanger.

12. Arrangement as claimed in claim 1, wherein said elements comprise extruded elements which are substantially longitudinal straight and double contoured plate-shaped elements.

13. Arrangement as claimed in claim 12, characterized in that said elements are constituted by in the flow direction extending straight parallel plate portions (110a, 110b) which extend downstream from curved plate portions (141', 142') of the bulb generator which face into the water flow.

14. Arrangement as claimed in claim 13, characterized in that said elements constitute a portion (110A) of the generator housing (110), said elements operating both as flow conducting structure and heat exchanger.

15. Arrangement as claimed in claim 12, characterized in that said elements constitute a portion (110A) of the generator housing (110), said elements operating both as flow conducting structure and heat exchanger.

16. Arrangement as claimed in claim 12, characterized in that said contour surface of the generator which is defined by said elements is on the upper access shaft (117) and/or the lower foundation (118).

17. Arrangement as claimed in claim 1, characterized in that said elements define said inner channels (112; 412) with inner protrusions in the form of cooling fins (113; 413) rendering a large heat conductance surface, and that said elements on the outside define said outer ribs and grooves extending in the flow direction for flow favourable surface contact with turbine water flowing therealong or thereabout.

18. Arrangement as claimed in claim 17, characterized in that said elements comprise extruded plate-shaped elements (111; 412) provided with protrusions (113; 413) on both sides of said plates, whereby said plate-shaped elements (111; 412) by assembly in pairs define said inner channels (112; 412) with cooling ribs (113; 413) and define said outer ribs for contact with bypassing turbine water.

19. Arrangement as claimed in claim 17, characterized in that said elements constitute a portion (110A) of the generator housing (110), said elements operating both as flow conducting structure and heat exchanger.

20. Arrangement as claimed in claim 17, characterized in that said contour surface of the generator which is defined by said elements is on the upper access shaft (117) and/or the lower foundation (118).

* * * * *